United States Patent Office 3,564,420
Patented Feb. 16, 1971

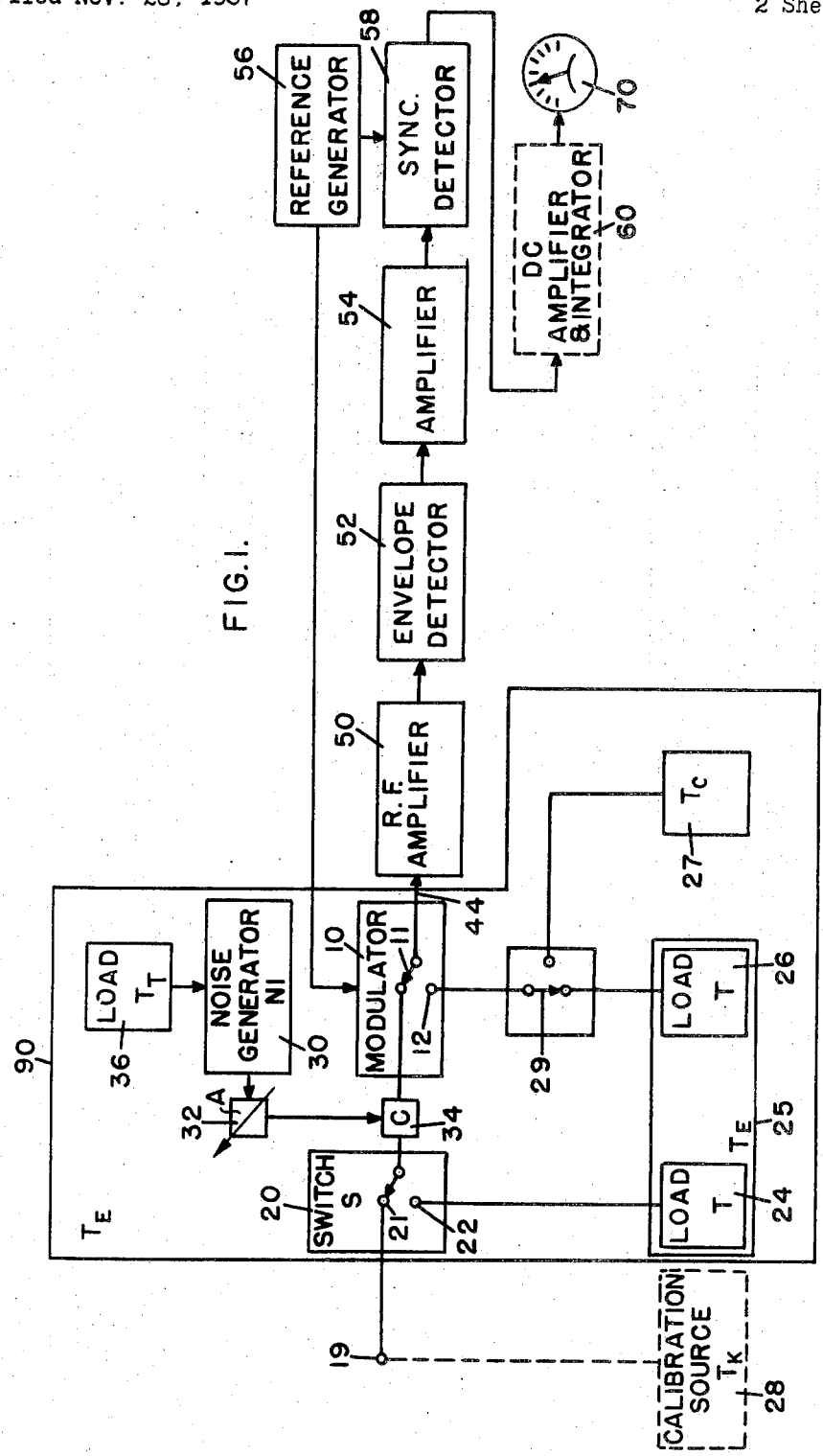

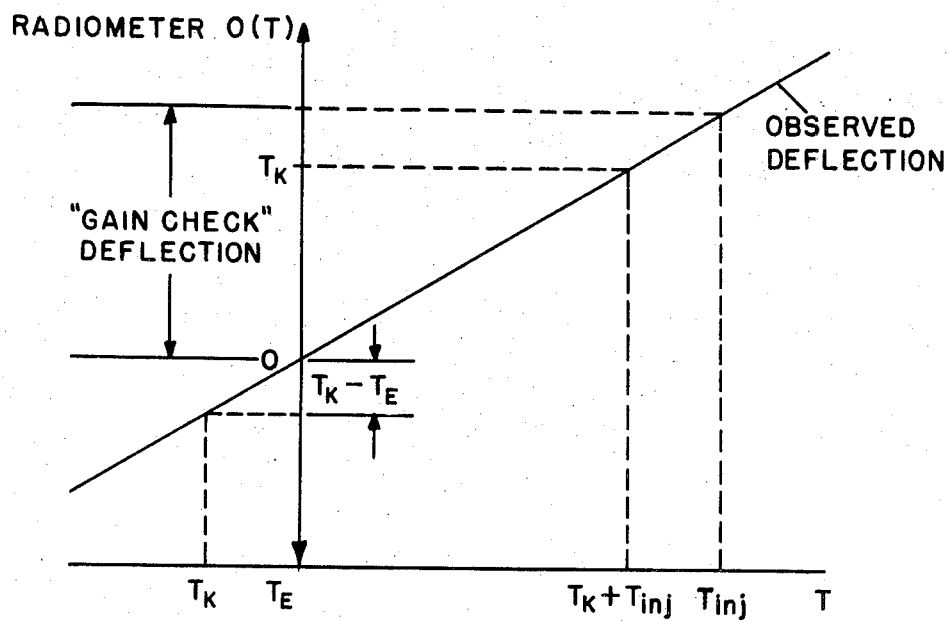

3,564,420
METHOD AND MEANS FOR PROVIDING AN ABSOLUTE POWER MEASUREMENT CAPABILITY
James E. Webb, Administrator of the National Aeronautics and Space Administration with respect to an invention of Harold I. Ewen, Weston, George G. Haroules, Lexington, and Wilfred E. Brown III, Acton, Mass.
Filed Nov. 28, 1967, Ser. No. 686,248
Int. Cl. H04b 1/02; G01k 15/00; G01r 35/00
U.S. Cl. 325—363
5 Claims

ABSTRACT OF THE DISCLOSURE

An input circuit for calibrating a relative power measuring radiometer to provide an absolute power measurement capability. The input circuit contains reference, switching and coupling devices such that the calibration of the composite absolute temperature measuring radiometer is achieved without the incorporation of cryogenic cooled noise sources as a part of the equipment. The radiometer output indicator zero position corresponds to absolute zero in degrees Kelvin. The injection of noise at a pre-set level in the input signal transmission path provides calibration of the output indicator scale directly in degrees Kelvin.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to microwave and millimeter radiometer receivers, and more particularly, to an input RF configuration for a switching type relative power measuring radiometer which enables measurement of the absolute temperature of microwave and millimeter noise sources. Operation of the circuit is such that the output indicator scale is calibrated directly in degrees Kelvin referenced to absolute zero.

The technique as described herein refers to that portion of the frequency spectrum in which the noise power level of broadband noise sources is describable in terms of an effective black-body temperature. The general concept can be extended to higher frequencies; however, care must be taken at infrared and optical frequencies to define the bandwidth of the receiving system and relate the measured noise power level to its integrated brightness distribution over the defined bandwidth.

A microwave or millimeter radiometer is basically a very stable receiver which has an inherent ability to provide a precise measurement of noise power temperature differences presented at its two input ports. Radiometers of this type are used extensively in the field of radio astronomy. A discussion of the methods of calibration and performance characteristics may be found in pages 210 through 237 in the book entitled "Telescopes," edited by Gerard P. Kuyper et al., published by the University of Chicago Press, Chicago, 1960.

Prior absolute temperature measurements, using a relative power, switching type radiometer, have in each case been predicated on knowledge of the fact that the signals to be measured are attenuated by the passive circuitry between the input port of the radiometer and the input signal port of the modulator used to derive the relative power difference signal. In addition, the resistive losses of this passive circuitry introduce noise into the signal path; and this added noise component is also then introduced at the input signal port of the switch. The conventional techniques for absolute calibration of a relative power measuring radiometer have concentrated on a precise measurement of the level of attenuation of the incoming signal by the passive circuitry in the signal path and the radiated noise associated with this circuitry. The measurement of signal attenuation has invariably been related to the conventional method of comparison to an attenuator standard; hence the precision to which an attenuation measurement can be made has determined the accuracy of absolute calibration. The radiated noise associated with the input circuitry is frequently calculated directly from the measured attenuation; hence, both the attenuation of the signal to be measured and the radiated noise of the measurement instrument circuitry has been determined by the degree of accuracy associated with an attenuation measurement.

Conventional methods also include design of the input circuit to provide an absolute minimum of attenuation combined with cooling of the input circuit to reduce the level of its radiated noise. The technique of cooling the input circuitry has frequently been used when a low noise amplifier, such as a maser or parametric amplifier, is used as the first active circuit. It is important to note that the ability to measure the effective noise temperaure of signals near absolute zero does not require a low noise amplifier since the function of the amplifier is merely to provide the desired level of sensitivity, low noise amplifiers do not, in general, provide nor does it directly follow that they should provide the best sensitivity. A low receiver noise temperature does not require the achievement of absolute temperature measurements. In fact, the reverse is true. The lower the receiver noise temperature— the greater the concern for the detector law characteristic and the more complex the receiver calibration. Receivers with relatively high noise temperatures in comparison with masers (1000° K. vs. 10° K.) are more suitable for effective noise temperature measurements near absolute zero since there is far greater assurance of a square law output detector response when the input signal power level is small in comparison with the effective receiver noise temperature.

The prior comments concerning the relationship of receiver noise temperature with the ability to achieve an absolute calibration do not represent a part of the invention described here, but are introduced to clarify a common misinterpretation of the more conventional published techniques for absolute temperature measurement. In some cases these are complicated by the assumption that a low noise amplifier is a prime requisite to the absolute temperature measurement of low level of noise powers.

OBJECTS AND SUMMARY OF THE INVENTION

An object of this invention is to provide a method and means for measuring the absolute temperature of microwave noise sources which is capable of providing an indication of the absolute temperature of the source on an indicator which is calibrated in degrees Kelvin referred to absolute zero.

Another object of this invention is to provide a method and means for the measurement of the absolute temperature of microwave noise sources, without the need for incorporation of cryogenic equipment in the measurement system.

Still another object of this invention is to provide a method and means for measuring the absolute temperature of microwave noise sources wherein all critical RF input circuit components of the measurement system are contained in a common environmental enclosure at a near ambient temperature.

And still another object of this invention is to provide a method and means for measuring the absolute temperature of microwave noise sources in which the accuracy of measurement instrument calibration is independent of any input circuit attenuation measurement.

To the accomplishment of the foregoing objects, additional objects and other features, the present invention comprehends the utilization of (1) introduction of a switch at the input port of the radiometer to provide a radiometer indicator zero scale reading, (2) the injection of noise into the signal path of the radiometer at a level adjusted to provide an absolute calibration of the radiometer output indicator with a zero scale reading corresponding to absolute zero in degrees Kelvin, and (3) the incorporation of a separate thermal noise source in the comparison path of the radiometer to monitor the pre-set noise injection level described under (2). This reference noise source is not required if other means are included for assuring that the pre-set level of the noise injected by the source under (2) remains constant.

BRIEF DESCRIPTION OF THE DRAWINGS

The novel features that are considered characteristic of this invention are set forth with particularity in the appended claims. The invention, both as to its organization and mode of operation, as well as additional objectives and advantages thereof, will best be understood from the following description when read in connection with the accompanying drawings, in which:

FIG. 1 is a block diagram of the instant apparatus for RF input zero translation and absolute calibration of the radiometer; and FIG. 2 is an explanatory graph illustrating the relationships between the various temperatures involved in the radiometer absolute calibration.

DESCRIPTION OF THE PREFERRED EMBODIMENT

The RF circuitry associated with the modification of a relative power measuring radiometer to achieve an absolute temperature measurement capability is shown in FIG. 1. The signal path is the transmission line from a signal input port 19 through port 21 of switch 20 and a coupler 34 to an input signal port 11 in a modulator 10 of the relative power measuring radiometer.

Prior to considering a detailed description of the RF circuitry portion of FIG. 1 it is well to consider the conventional operational aspects of the signal processing, receiver circuitry. An RF modulator 10 at the receiver input 44 acts as a single-pole, double-throw switch. The modulator 10 provides an amplitude modulated noise signal input to the radiometer which is proportional to the temperature difference between the noise powers presented to the input port 11 and comparison port 12 of the modulator. The modulation component is amplified at the RF frequency by an RF amplifier 50, detected by an envelope detector 52 and is then further amplified by a narrow band amplifier 54 at the modulation frequency. The signal is then synchronously detected by means of a reference generator 56 and a phase detector 58 to provide to an indicator unit 70 an output voltage proportional to the input temperature difference. A post detection integration and DC amplification unit 60 shown in dotted lines may be omitted; however, RF is frequently introduced between the detector output and the indicator system input in order to extract the average value of the amplitude modulated signal. That portion of the radiometer following the modulator output 44 is common to several modes of radiometer operation. The reasonable assumption can be made that the noise power signal level is sufficiently low relative to the receiver noise level to assure a square law detector response.

The radiometer shown in FIG. 1 comprises three basic units: (1) an RF processing unit consisting of everything enclosed in chamber 90; (2) an indicator 70; and (3) a signal processing unit comprising elements 50, 52, 54, 56, 58 and 60. Zeroing of each of the three basic units is required. The zeroing of the indicator unit and the zeroing of the signal processing unit is accomplished by conventional methods. The zeroing of the RF processing unit 90 is hereinafter described in detail.

As noted previously, any noise power signal presented to the signal input terminal will be attenuated by the losses associated with the passive circuitry of the signal transmission path. In addition, noise will be radiated by the passive circuitry contained in the signal path and this added noise will be presented at the input signal port 11 of the relative power measuring radiometer. The attenuation of the input signal can be characterized by a loss L and the effective temperature of the added noise by $T_a$. If the effective temperature of the signal noise power is $T_s$, the corresponding temperature at the input signal port 11 of the relative power measuring radiometer is given by:

$$\text{Input to port } 11 = \frac{T_s}{L} + T_a \qquad (1)$$

Prior art radiometric methods of absolute temperature measurement have involved techniques for the measurement of the loss L which involves attenuation measurements. Determination of the radiated noise $T_a$ has been deduced from its relationship to the measured value of the loss L since:

$$T_a = \left(1 - \frac{1}{L}\right) T_L \qquad (2)$$

where:

$T_L$ = is the thermometric temperature of the transmission line components which comprise the losses L.

If the various parts of the RF circuit are not at the same temperature $T_L$ then a summation of various terms in the form of Equation 2 are required. This has led to considerable complication of prior art techniques, particularly where portions of the circuit are operated at thermometric temperatures near absolute zero while others are maintained at temperatures near earth ambient.

A significant feature of the invention is to maintain all portions of the RF circuit preceding the relative power measuring radiometer at a temperature near earth ambient by means of a thermal enclosure 90. This temperature will be referred to hereafter as $T_E$. In this case:

$$T_a = \left(1 - \frac{1}{L}\right) T_E \qquad (3)$$

and no summation of terms is required since all signal path transmission line circuitry is at the same temperature.

The same argument follows for the transmission line from the dual reference noise source 25 comprising two reference loads 24 and 26 which are both at temperature $T_E$ through a switch 29 to a comparison port 12 of the relative power measuring radiometer. The effective temperature input to the comparison port 12 with a switch 29 connected as shown is in accord with Equation 1, given by:

$$\text{Input to port } 12 = \frac{T_E}{L} + T_a \qquad (4)$$

which is equal to the temperature $T_E$ through the relationship of $T_a$ given by Equation 3.

The various steps in the calibration procedure to provide an absolute temperature measurement capability (shown graphically in FIG. 2) include:

(1) Establishing the zero scale position of the relative power measuring radiometer output indicator.

(2) Introducing a known source of noise power $T_K$ at the input terminal of the radiometer. (The precision of calibration is improved by selecting a noise source whose effective noise temperature is close to absolute zero.)

(3) Noting the negative deflection of the output indicator from its zero scale reading ($T_K - T_E$) and relating this deflection to the scale calibration in degrees Kelvin as equivalent to the temperature difference between that of the environmental enclosure $T_E$ and that of the calibration source $T_K$.

(4) Injection of noise $T_{inj}$ into the signal transmission path to provide a positive deflection of the output indicator equivalent to the temperature of the calibration source $T_K$ based on the scale units in degrees Kelvin determined in the prior step.

These steps in sequence calibrate the entire radiometer system so that the output indicator 70 provides a reading in degrees Kelvin referenced to absolute zero. Once the system has been calibrated, appropriate operation at any future time is achieved by connecting the switch 20 to comparison port 22 with the noise generator 30 extinguished, and noting the position of the indicator scale zero. The noise generator 30 is then ignited and the gain of the receiver adjusted to provide an indicated output temperature equivalent to the known environmental temperature $T_E$ of the RF input enclosure 90.

The circuit logic for the various steps in the calibration procedure described above is as follows:

To establish the indicator 70 scale zero position, the switch 20 is placed in position 22 and the input temperature to the port 11 is then given by:

$$\text{Input to port } 11 = \frac{T_E}{L} + T_a = T_E \tag{5}$$

Since the input temperature at port 12 is also $T_E$, the power difference, and hence effective temperature difference between the ports 11 and 12 is zero. The output indicator 70 of the relative power measuring radiometer will then provide a scale position of zero since the relative input power difference equals zero at its input ports.

When the known source of noise power 28 at an effective temperature $T_K$ is connected to the signal input port of the radiometer, the effective temperature at the input port 11 of the relative power measuring radiometer with the switch 20 connected to input port 21 is then:

$$\text{Input to port } 11 = \frac{T_K}{L} + T_a \tag{6}$$

Re-expressing the temperature $T_E$ at the comparison port 12 in the form of Equation 5, the power difference between the input port 11 and the input port 12 of the relative power measuring radiometer can then be written in the form:

$$\left(\frac{T_K}{L} + T_a\right) - \left(\frac{T_E}{L} + T_a\right) = \frac{1}{L}(T_K - T_E) \tag{7}$$

which provides a negative deflection of the output indicator proportional to the temperature difference between the environmental chamber 90 and the absolute temperature of the known source of noise $T_K$. The proportionality factor is the reciprocal of the attenuation in the signal path transmission line ($1/L$). The value of $L$ is not measured since it is not important to determine the proportionality factor, the significant point is to note that the deflection is directly proportional to the temperature difference between two sources of known temperature, i.e., $T_K$ and $T_E$. Calibration of the indicator scale in degrees Kelvin is provided by noting that the deflection is proportional to this temperature difference and hence provides the relationship between the deflection in scale units and equivalent temperature units.

The next step in the calibration procedure is to ignite a noise generator 30 which is terminated by load 36 and adjust the combination of attenuator 32 and coupler 34 between the noise generator and the signal transmission path such that the added noise when referred to the input port 11 of the relative power measuring radiometer provides an output indicator reading equivalent to the value of $T_K$ in the previously defined equivalence between temperature and indicator scale units. Note that in this step the proportionality factor of ($1/L$) will be retained. This can be seen by noting that if the amount of noise injected into the signal path is equal to the quantity ($T_E - T_a$), then the effective temperature at the input port 11 of the relative power measuring radiometer with noise source $T_K$ introduced at the signal input port will be:

$$\text{Input to } 11 = \frac{T_K}{L} + T_a + (T_E - T_a) \tag{8}$$

The temperature difference between the input port 11 and the input port 12 is then:

$$\frac{T_K}{L} + T_a + (T_E - T_a) - T_E = \left(\frac{1}{L}\right)T_K \tag{9}$$

In adjusting the amount of injected noise, it is not necessary to know that the amount of noise required is equivalent to the quantity ($T_E - T_a$), nor is it required that the value of $T_a$ be known. All that is required is to adjust the injected amount of noise to obtain an output indicator reading equivalent to $T_K$ in the previously determined indicator scale units in equivalent degrees K.

This completes the laboratory calibration procedure following which the known source of noise power at an effective temperature $T_K$ is no longer required. Verification of the calibration at some future time under field operating conditions is obtained by connecting the switch 20 to comparison port 22 with the noise generator 30 extinguished to provide verification of the output indicator zero scale reading. Ignition of the noise generator 30 will then provide a positive scale indication corresponding to an input signal noise temperature of $T_E$ in the previously established equivalence between indicator scale units and degrees Kelvin. The only adjustment required to provide the appropriate output indicator deflection is an adjustment of the receiver gain. It is important to note again that the constant of proportionality ($1/L$) will continue to influence the indicator reading but will not influence the absolute calibration of the indicator. When the switch 20 is connected to port 22, the input to the signal path transmission line is at a temperature $T_E$. With the noise generator 30 ignited, the input to port 11 of the relative power measuring radiometer is then:

$$\text{Input to port } 11 = \frac{T_E}{L} + T_a + (T_E - T_a) \tag{10}$$

The corresponding effective temperature difference between the ports 11 and 12 (with the input temperature to 12 always at $T_E$) is then:

$$\frac{T_E}{L} + T_a + (T_E - T_a) - T_E = \left(\frac{1}{L}\right)T_E \tag{11}$$

The function of the switch 29 and a single noise source 27 at a temperature $T_C$ is to provide an independent measure of the noise level injected by the noise generator 30—attenuator 32—coupler 34 combination. At microwave and millimeter frequencies, the noise generator 30 would typically take the form of a gas discharge. Any variation in the intensity of this source can easily be noted by monitoring the effective power change at the input to the relative power measuring radiometer with that provided by injecting a power difference equivalent to a temperature difference of $T_E - T_C$ at the comparison port 12 of the relative power measuring radiometer. The effective temperature $T_C$ would be provided in this case by a resistive load contained in a separate insulated oven 27 at a known and elevated temperature with respect to $T_E$.

As shown in FIG. 1 switch 20 and 29 are typically two-port mechanical waveguide mechanical switches. The modulator 10 is typically a four-port Faraday rotational device. However, the switches 20 and 29 could also be a four-port Faraday rotational device. The calibration source 28 may typically be an RF load in a cryogenic bath or any other desired temperature load. The reference loads 24, 26, 27 and 36 are typically sections of waveguides with an absorbent material placed at one end of the waveguide to absorb all incident radiation and to reflect none back. Calibration load 27 is enclosed in an oven at some elevated temperature with respect to $T_E$. An important teaching of the invention is that the loads 24, 26 and 36 are all at the same temperature. The attenuator 32 is a typical waveguide attenuator consisting of a mechanical vane which is capable of various positions of insertion in the main signal path of the waveguide. The noise generator 30 may typically be either a neon or an argon gas discharge tube mounted into a section of waveguide at a slight angle.

The RF amplifier 50 is a conventional RF amplifier which amplifies the RF. The detector 52 detects the envelope variations of the RF microwave signal. The envelope variations are in the audio frequency range and are produced by the action of the modulator 10. The phase detector 58 typically consists of four detectors arranged in a bridge circuit to allow sampling of the envelope detected signal. The reference generator 56 controls both the modulator 10 and the phase detector 58 to provide synchronism of the sampling. Reference generator 56 is operated at any desired choice of switching frequency as long as it is not an integral multiple of a principle power source in the line. Typical operating rates may be at 37 cycles per second, or 1,000 cycles per second, or 959 cycles per second, etc. In comparison with the low rates of switching back and forth between the signal port 11 and the comparison port 12 of the modulator 10, the frequency of the input signal being measured may be on the order of 8 gigacycles or 15 gigacycles which means that the signal processing unit is responding to the average of a much larger number of the signal frequencies which is what is desired.

It is to be noted that the signal input port 19 may be any type of desired RF transmission line. The transmission to signal input 19 may, for example, comprise an antenna feed horn or it may be a section of waveguide connected at the other end to a nuclear thermal pile or it may be connected to any apparatus converting a temperature being measured into equivalent RF energy. Although, for simplicity, the output indicator 70 is shown as a meter other types of utilization devices may be employed as, for example, strip chart recorders and digital data presentation devices.

The above-described method and apparatus has been tested at 8 gHz. and at 15 gHz. Gas discharge noise sources were used throughout the calibration procedure to monitor receiver gain. The noise injection level of these sources relative to the comparison port of the modulator at frequencies of 8 gHz. at 15 gHz. were 306° K. and 302° K. respectively. The measured sensitivity of the 8 gHz. radiometer was 0.04° K. RMS and for the 15 gHz. radiometer was 0.06° K. RMS for a post detection integration time constant of one second. The corresponding peak to peak fluctuation level at the output indicator was of the order of 0.25° K. and 0.37° K. respectively for the 8 gHz. and 15 gHz. radiometers. Temperature changes introduced in the waveguide by the heat from the switch coil in its energized position were easily detected.

Accordingly, there has been shown and described herein a novel, useful and improved method and means for measuring the absolute temperature of microwave noise sources under field conditions as a direct reading of obsolute zero and directly in degrees Kelvin.

A feature of the invention is that the measurement of signal transmission line resistive losses are not required for absolute calibration.

Another feature of the invention is that a cryogenic load is not required nor may an integral part of the operational system; the cryogenic load is used only if desired for laboratory calibration of the instrument.

Still another feature of the invention is that precise knowledge of the directional coupler value and attenuator value are not required.

And a still further feature of the invention is that calibration accuracy is determined to a high percentage accuracy by the ability to measure differential deflections at the output indicator.

The specific embodiments herein described are intended to be merely illustrative and not restrictive of the invention. Various modifications and changes in form and detail will be obvious to those skilled in the art. There are many alternative embodiments of this invention. For example, a superheterodyne receiver can be substituted for an RF receiver. And, if it is desired to provide a small operating calibration signal, an additional noise generator, coupler and load operating independently of the original noise generator can be added in the signal side of the modulator. Also, if a maser is used instead of the RF amplifier then the two loads for the input switch and the modulator are placed in a cryogenic atmosphere to reduce the amount of noise preceding the maser. And if noise signals at temperatures above absolute zero make receiver gain variations noticeable, the indicator zero reference level can be adjusted to a temperature near the anticipated signal temperature by simply adding an additional noise source and attenuator in the comparison side of the modulator.

What is claimed is:

1. The method of calibrating the absolute power or related temperature of a source radiating microwave energy into a switching type microwave radiometer measuring system having an R.F. unit, a signal processing unit, and an indicator unit, comprising the steps of:

establishing an R.F. balance condition in said R.F. unit to provide an absolute R.F. zero on said indicator unit by setting the relative input power differences equal to zero at the input ports of said R.F. unit;

measuring the system gain of said radiometer to provide a quantitative indication of temperature deflection in degrees Kelvin by introducing a known source of noise power to provide a negative deflection of said output indicator unit proportional to the temperature difference between a source of known temperature in said R.F. unit and said known source of noise power; injecting noise into said radiometer; and adjusting the value of said injected noise to provide a positive value of temperature deflection proportional to the absolute temperature of said known source of noise power.

2. The method as defined in claim 1 which further includes the step of independently zeroing said signal processing unit, and the step of independently zeroing said indicator unit.

3. Apparatus for measuring the absolute power or related temperature of a source radiating microwave energy comprising:

first switching means having an input signal port and a comparison port, said input port receiving signals from said source being measured;

first reference load means connected to said comparison port of said switching means;

modulator means having an input signal port connected to the output of said switching means and a comparison port;

a second reference load means connected to said modulator comparison port;

noise injection means interconnecting said switching means and said modulator means;

a second switching means connected intermediate said comparison port of said modulator and said second reference load;

a third reference load controlled by said second switching means;

means for maintaining all of said aforementioned means at the same temperature;

a signal processing unit connected to the output of said modulator means; and an indicator unit connected to the output of said signal processing means.

4. The apparatus as defined in claim 3 wherein said third reference load has a temperature substantially different from the temperature of said first and second reference loads.

5. The apparatus as defined in claim 3 wherein said noise injection means comprises a fourth reference load, an attenuator, gas discharge noise means interconnecting said third reference load and said attenuator, and coupler means connected intermediate said attenuator, said switching means and said modulator means.

References Cited
UNITED STATES PATENTS

| | | | |
|---|---|---|---|
| 2,973,513 | 2/1961 | Hovda | 325—363X |
| 3,325,644 | 6/1967 | Frye et al. | 73—355X |
| 3,409,827 | 11/1968 | Goggings | 325—363X |

LOUIS R. PRINCE, Primary Examiner

F. SHOON, Assistant Examiner

U.S. Cl. X.R.

73—1, 355; 250—83; 343—100